(No Model.)
G. H. REYNOLDS.
Process of and Apparatus for Drying Air.
No. 242,368. Patented May 31, 1881.
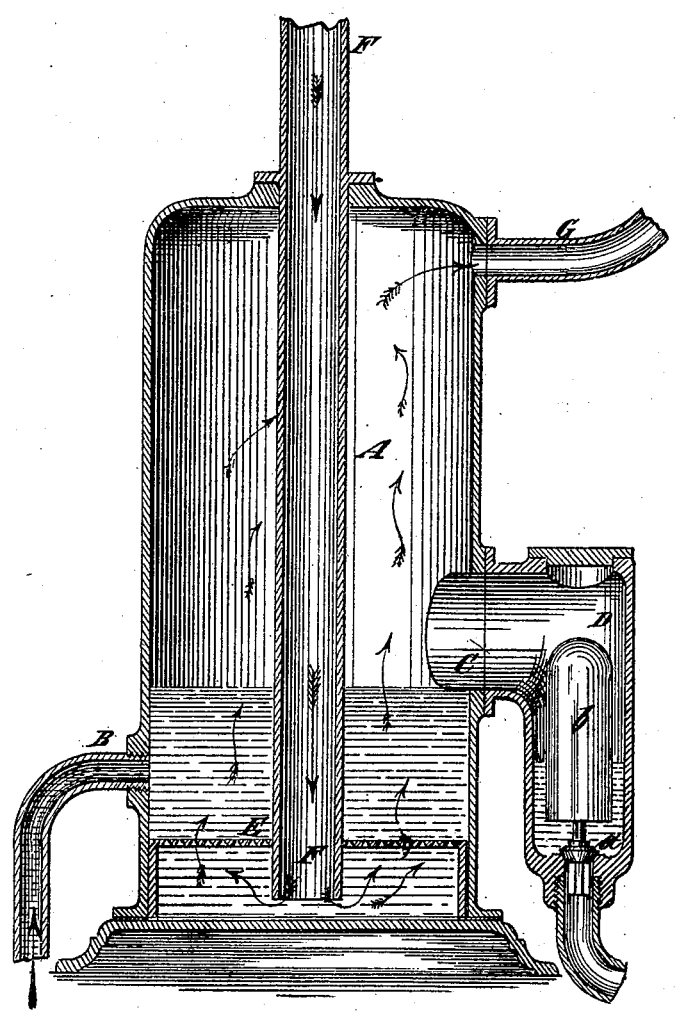
Witnesses
John Becker
A. C. Webb
Inventor
Geo. H. Reynolds
by his attorneys
Brown & Brown

United States Patent Office.

GEORGE H. REYNOLDS, OF NEW YORK, N. Y., ASSIGNOR TO HIMSELF AND GEORGE H. ROBINSON, OF SAME PLACE.

PROCESS OF AND APPARATUS FOR DRYING AIR.

SPECIFICATION forming part of Letters Patent No. 242,368, dated May 31, 1881.

Application filed May 27, 1880. (No model.)

*To all whom it may concern:*

Be it known that I, GEORGE H. REYNOLDS, of the city of New York, in the county and State of New York, have invented a certain new and Improved Process of and Apparatus for Drying Air, of which the following is a specification.

I am aware that air has been cooled and dried by passing it through water or through chambers into which water is sprayed, and that a fan-blower has been used to force the air to be cooled and dried through said chambers successively, the air, after being thus cooled and dried, being employed for cooling cellars, storage-rooms, or refrigerating-buildings. In such apparatus it has not been necessary to compress the air to any great extent, and the blower has not been used for this purpose, but simply to set the air in motion and produce a circulation of air through the several spray chambers or pipes. One great disadvantage in the use of such an apparatus is that the water employed for cooling must be of a lower temperature than the surrounding air, and hence to cool the air to any material extent artifically-refrigerated water must be used.

It is a well-known fact that air of a pressure of twenty atmospheres will hold in suspension no more moisture than an equal volume of air of the atmospheric pressure. Hence when air is compressed to twenty atmospheres it will retain in suspension only a little over one-twentieth of the moisture contained before compression, whatever is retained over one-twentieth being due to the rise of the air in temperature during compression. If such compressed air be passed through water even of the temperature of the air before compression, and kept in a compressed state during and after its passage through the water, the air will be cooled to its original temperature, or lower if cooled water be used, and a large proportion of the moisture still held in suspension will be taken up by the water through which the air is passed, because of its affinity for moisture, and the air to that extent will be dried.

My invention consists in a novel process of drying air—namely, in compressing air and passing it, while in a highly-compressed state, through and in direct contact with water, which may be even of as high a temperature as that of the air before compression, whereby, through the compression and subsequent cooling of the air to its normal or a lower temperature, almost the whole of the moisture which it held in suspension before compression will be freed from it, this being accomplished principally through its compression, but additionally through its cooling and the affinity of the water used in cooling for the moisture remaining in it when the latter is brought into contact with the water in cooling. In order to increase the effect of the water, the air, while passing through it, is preferably divided into fine jets or streams, thus producing a more intimate contact of the air and water.

The invention also consists in apparatus of novel construction for carrying out my improved process.

The accompanying drawing represents a central vertical section through an apparatus for drying air according to my process.

A designates a chamber or air-tight cylinder or drum, in which the air is subjected to the action of the water, and which is provided with an inlet-pipe, B, for water, and an outlet, C, therefor, placed at some distance above the bottom of the cylinder or drum. As here represented, this outlet or overflow for the water communicates with a valve shell or chamber, D, the outlet of which is closed by a valve, *a*, furnished with a float, *b*, for holding it to its seat. When the water overflows sufficiently into the shell or chamber D to raise the float *b* the valve is opened and a portion of the water is permitted to escape.

E designates a perforated plate or diaphragm, extending across the cylinder or drum A at a distance below the overflow C, to maintain a depth of water above the plate or diaphragm sufficient for the operation of the apparatus.

F designates the inlet-pipe for the compressed air, terminating below the perforated plate or diaphragm E; and G designates a discharge or delivery pipe for the dried air, connected to the upper part of the cylinder or drum A.

In the operation of my apparatus the water is automatically maintained by the overflow C at a proper height above the plate or diaphragm E, and compressed air, entering through the pipe F, passes upward through the water, as indicated by the arrows, and out at the air-delivery G. The air is very finely divided by the perforated plate or diaphragm, and its particles are all brought into contact with the water. The water employed may be of any desirable temperature; but it is desirable to use water as nearly as possible of the temperature at which air will hold the least moisture. By the action of the water the air is cooled to a temperature at which the moisture held in suspension will be apt to condense, and by the affinity of water for water the moisture is taken up and retained by the water through which the air is passed. A cubic foot of air of a very high pressure—say, for example, twenty-five atmospheres—contains no more moisture than an equal volume of air at the atmospheric pressure; and hence it will be seen that I provide for economically and quickly drying large volumes of air by the use of water of the same temperature as that of the air before compression, whereby the trouble and expense of artificially cooling the water used are obviated and an important saving is effected.

What I claim as my invention, and desire to secure by Letters Patent, is—

1. The process of drying air, consisting in compressing the same, in passing it while in a highly-compressed state through and in direct contact with water, which may be even of as high a temperature as that of the air before compression, whereby, through the compression and subsequent cooling of the air to its normal or a lower temperature, almost the whole of the moisture which it held in suspension before compression will be freed from it, this being accomplished principally through its compression, but additionally through the cooling and the affinity of the water used in cooling for the moisture remaining in the air when the latter is brought into contact with the water in cooling, substantially as specified.

2. The process of drying air, consisting in compressing the same, passing it while in a highly-compressed state through and in direct contact with water, which may be even of as high a temperature as that of the air before compression, and dividing it while passing through water into fine jets or streams, whereby, through the compression and subsequent cooling of the air to its normal or a lower temperature, almost the whole of the moisture which it held in suspension before compression will be freed from it, this being accomplished principally through its compression, but additionally through its cooling and through the affinity of the water used in cooling for the moisture remaining in the air when the latter is brought into contact with the water in cooling, substantially as specified.

3. The combination of a chamber or cylinder, pipes or conduits for conveying air thereto, other pipes or conduits for supplying water thereto, and a valve controlling the outflow of water and regulated in its action by the height of the water, substantially as specified.

4. The combination of a chamber or cylinder, A, air-inlet pipe F, air-outlet pipe G, water-inlet pipe B, water-outlet pipe C, valve shell or chamber D, valve $a$, and float $b$, all substantially as specified.

GEO. H. REYNOLDS.

Witnesses:
A. C. WEBB,
CHANDLER HALL.